United States Patent [19]
Izraeli

[11] 3,757,031
[45] Sept. 4, 1973

[54] SELECTIVELY CLOSABLE PROTECTIVE ENCLOSURE FOR ELECTRICAL SPLICES AND THE LIKE

[75] Inventor: Hyman Izraeli, Elizabeth, N.J.

[73] Assignee: Thomas & Betts Corporation, Elizabeth, N.J.

[22] Filed: May 2, 1972

[21] Appl. No.: 249,568

[52] U.S. Cl............. 174/138 F, 138/155, 138/162, 174/92
[51] Int. Cl.......................... H02g 15/08, H01r 5/02
[58] Field of Search .................... 174/92, 93, 138 F, 174/153 G, 156; 138/128, 155, 156, 162, 166, 168; 220/4 B, 4 E, 9 F; 339/107, 141, 208

[56] References Cited
UNITED STATES PATENTS

| | | | |
|---|---|---|---|
| 1,105,844 | 8/1914 | Schaperjahn ................... | 138/157 X |
| 1,674,253 | 6/1928 | Lightfoot ............................ | 339/208 |
| 2,894,056 | 7/1959 | Bogese............................... | 174/92 |
| 2,922,836 | 1/1960 | Brown............................ | 174/153 G |
| 2,945,085 | 7/1960 | Billups ........................... | 174/156 X |
| 3,009,986 | 11/1961 | Stephens........................... | 174/93 X |
| 3,095,337 | 6/1963 | Chase ................................. | 138/155 |
| 3,624,270 | 11/1971 | Turner......................... | 174/138 F X |

FOREIGN PATENTS OR APPLICATIONS

| | | | |
|---|---|---|---|
| 117,776 | 5/1930 | Austria ................................. | 174/92 |
| 1,118,296 | 11/1961 | Germany ........................... | 174/156 |
| 816,918 | 7/1959 | Great Britain ........................ | 174/92 |

Primary Examiner—Laramie E. Askin
Attorney—David Teschner et al.

[57] ABSTRACT

A protective enclosure preferably for spliced connections and the like comprising, in one embodiment, a pair of universally mating members each having a male and female portion of selectively engageable latch means and a highly resilient inner liner wherein said device may be releasably locked about a wide range of joint sizes to provide a protective enclosure therefore. Further embodiments comprise a plurality of mating members interengageable both circumferentially and longitudinally to further increase the range and versatility of the enclosure. The liner may be formed from a closed cell sponge rubber material or the like. The male and female latch means portions each comprises selectively formed teeth disposed adjacent at least one surface thereof, to provide interlocking engagement in any one of a number of selective positions.

14 Claims, 12 Drawing Figures

PATENTED SEP 4 1973
3,757,031
SHEET 1 OF 3
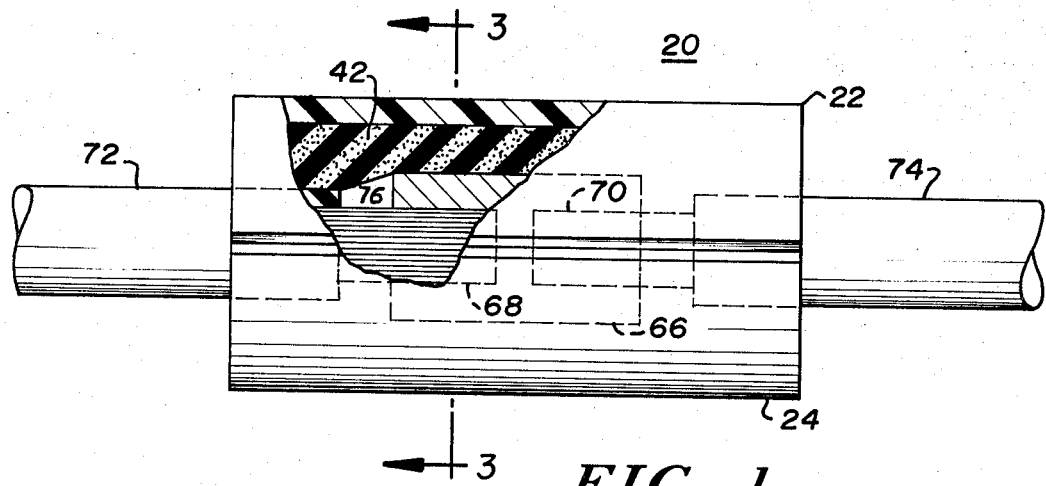
FIG. 1
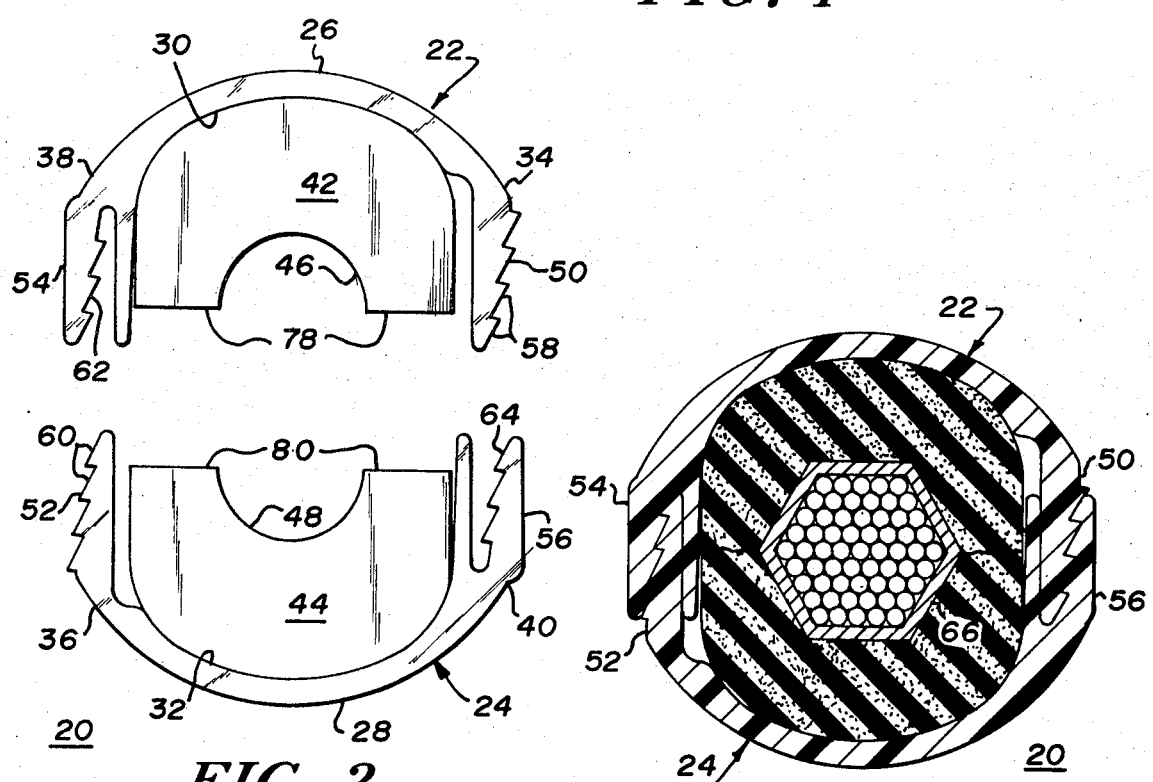
FIG. 2
FIG. 3
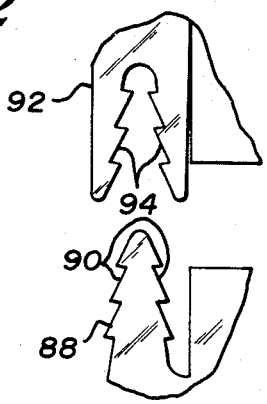
FIG. 4

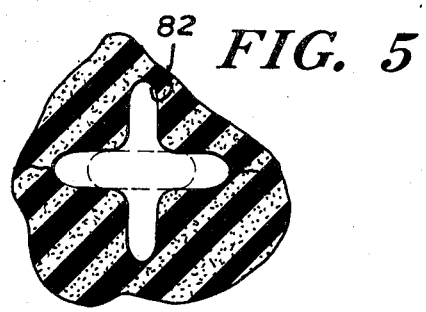
FIG. 5
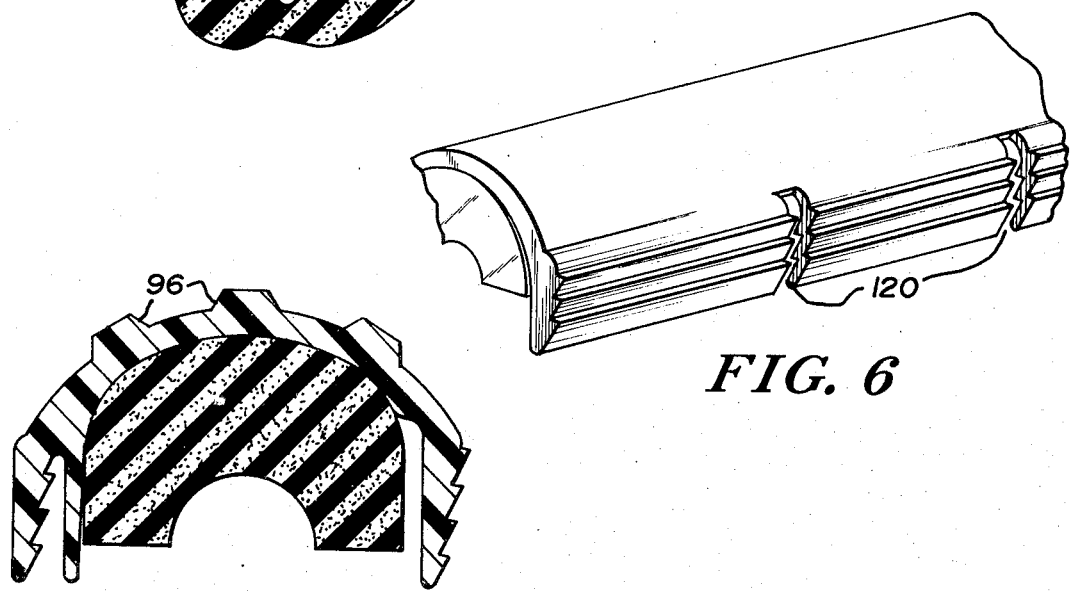
FIG. 6
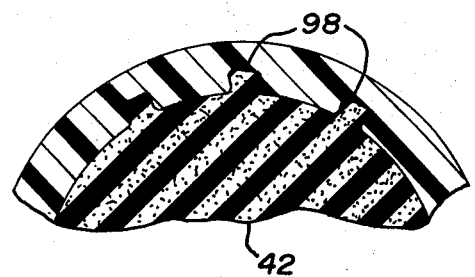
FIG. 7
FIG. 8
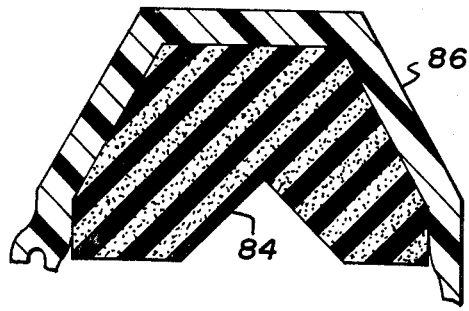
FIG. 9

3,757,031

SELECTIVELY CLOSABLE PROTECTIVE ENCLOSURE FOR ELECTRICAL SPLICES AND THE LIKE

BACKGROUND OF THE INVENTION

1. Field of the Invention

The invention is directed to the field of enclosures and principally to a device for protectively enclosing an exposed joint or the like.

2. Description of the Prior Art

Although various prior art structures have been devised for enclosing an exposed joint or the like, such devices are generally limited in application with respect to either the range of joint size encloseable therewithin or the manner in which the hinged or mating halves thereof are secured one to another to provide the completed assembly. For example, in U.S. Pat. No. 3,054,849 issued Sept. 18, 1962, to L. J. Colbert there is disclosed a single piece enclosure for cable splices requiring an extensive lacing operation to effect the closure thereof about a splice joint contained therewithin. In U.S. Pat. No. 3,325,591 issued June 13, 1967 to F. W. Wahl there is disclosed a hinged insulated cover in which the halves thereof are held in locking engagement about the conductors contained therewithin by means of positionally non-variable locking tabs arranged to maintain the hinged member in fixed position about the contained assembly, disadvantageously limiting the range of use thereof. A further protective cover for a spliced connection or the like is disclosed in U.S. Pat. No. 2,908,744 issued Oct. 13, 1959 to E. W. Bollmeier and similarly comprises a hinged or connected cover member employing positionally fixed locking or latching means to maintain the cover in closed relationship about the contained connection or splice but further requiring, however, the introduction of a resin thereinto to complete the assembly.

SUMMARY OF THE INVENTION

The invention overcomes the limitations noted above with respect to prior art devices by providing a reusable, universally matingly adjustable enclosure having preferably a highly resilient inner liner and selectively engageable latching means to provide a highly versatile, easily manufactured and readily extrudable device employable as a protective cover or enclosure for exposed connections and the like. Attached to the inner surface of each of a pair of selectively shaped generally complementarily formed outer members is a highly resilient selectively formed liner means formed preferably of relatively soft sponge-like material. Extending generally laterally adjacent each of the longitudinally extending edges of each member are respective male and female latch means portions each having a series of teeth extending generally from the outer most edge thereof towards the adjacent edge of the outer member to permit the members to be circumferentially disposed about the joint or connection to be enclosed with a male latch portion of one of the members aligned in opposed relationship with respect to the female latch portion of the other member, thus permitting the members to be urged together and selectively locked in position to provide a relatively tight sealed enclosure about the contained joint or splice. The rapid and convenient removal of the cover from said connection or joint is accomplished simply by disengaging the previously interlocked male and female latch means portions. By forming the outer members in symmetrical fashion any two of a plurality of such members may be employed to form such enclosure thus providing further convenience, versatility and economy of manufacture. The selectively engageable latch arrangement in combination with a highly resilient inner liner serves to permit the adaptation of a particularly sized enclosure to a wide range of sizes of joints or connections. Where such enclosure is to be employed with electrical conductors or the like, the outer members may be formed of a material having high dielectric properties which may include any one of a number of commonly employed plastic materials. The inner liner may also be formed from electrically insulating material such as, for example, closed-cell sponge rubber or the like. Although highly desirable in many applications, the hermaphroditic structure may be modified in such manner as to provide non-symmetrical members advantageous in those applications where the identity of each of the members is desired to be preserved. The outer members may be suitably contoured to define selective mating segments of a circle, hexagon, octagon, or the like, where necessary or desirable either for functional or identificational purposes and where, for example, it is desired to limit the size of each of the mating segmented members of the enclosure. The versatility of the instant device may be further increased by providing mating interlocking portions adjacent the opposing ends of each member to permit the enclosure to be assembled in elongate sections where the length of a single member would be insufficient to cover the desired area of the joint or connection. It is therefore an object of this invention to provide an improved enclosure for splice connections and the like.

It is another object of this invention to provide selectively positionable enclosure means for splice connections and the like.

It is a further object of this invention to provide a protective enclosure adapted to receive a wide range of sizes of splice connections and the like.

It is still another object of this invention to provide a universally mating multi-part enclosure for splice connections or the like.

It is still a further object of this invention to provide a reusable insulating enclosure for splice connections or the like.

It is yet a further object of this invention to provide an improved closure for splice connections and the like incorporating highly resilient liner means therewith to permit the confirmation thereof to variously configured splice connections or joints.

It is yet a further object of this invention to provide enclosure means having longitudinally interlocking members to conveniently increase the length thereof.

Other objects and features of the invention will be pointed out in the following description and claims and illustrated in the accompanying drawings which disclose, by way of example, the principle of the invention and the best modes contemplated for carrying it out.

BRIEF DESCRIPTION OF THE DRAWINGS

In the drawings:

FIG. 1 is a front elevational view, partly in section, of an enclosure for a splice connection and the like constructed in accordance with the concepts of the invention.

FIG. 2 is a side elevational view in which the members of the device of FIG. 1 are shown disassembled.

FIG. 3 is a side elevational view, in section, of the device of FIG. 1 taken along the line 3—3.

FIG. 4 is a fragmentary side elevational view showing an embodiment of male and female latch means portions of an enclosure constructed in accordance with the concepts of the invention.

FIG. 5 is a fragmentary elevational view, in section, of a portion of the liner means of an enclosure constructed in accordance with the concepts of the invention.

FIG. 6 is a fragmentary perspective view of an embodiment of a member of an enclosure constructed in accordance with the concepts of the invention.

FIG. 7 is a side elevational view, in section of a further embodiment of a member of an enclosure constructed in accordance with the concepts of the invention.

FIG. 8 is a fragmentary side elevational view, in section, of still another embodiment of a member of an enclosure constructed in accordance with the concepts of the invention.

FIG. 9 is a fragmentary side elevational view, in section, of still another embodiment of a member of an enclosure constructed in accordance with the concepts of the invention.

Similar elements are given similar reference characters in each of the respective drawings.

DESCRIPTION OF THE PREFERRED EMBODIMENTS

Figure 10:
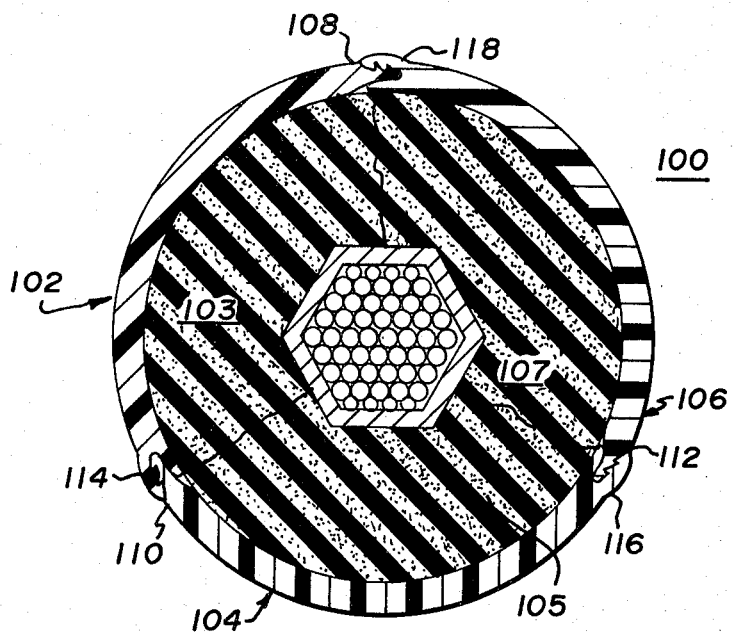
FIG. 10 is a side elevational view, in section, of a further embodiment of a enclosure constructed in accordance with the concepts of the invention.

Turning now to FIGS. 1, 2 and 3 there is shown an enclosure 20 constructed in accordance with the concepts of the invention. As may be more clearly seen in FIGS. 2 and 3 enclosure 20 comprises a pair of generally arcuate members 22 and 24 forming the outer shell of enclosure 20. Each of the members 22 and 24 comprises, respectively, an outer surface 26, 28, an inner surface 30, 32, a first edge 34, 36, and a second edge 38, 40. Disposed adjacent each of the inner surfaces 30, 32 respectively, of members 22, 24 is a resilient liner 42, 44 having an inner surface 46, 48 selectively contoured to form at least a portion of an article receiving chamber as the members 22, 24 are positioned in generally opposed relationship. The members 22, 24, respectively, are each provided with the male portion 50, 52 of a latch means extending generally laterally adjacent their respective first edges 34, 36 and the female portion 54, 56 of the latch means extending generally laterally adjacent their respective second edges 38, 40. The latch means male portions 50, 52 are each provided with a series of external teeth 58, 60 are arranged to interlock with a complementarily formed series of similar teeth 62, 64 disposed on an inner surface of the latch means female portions 54, 56. The outer members 22, 24 may be formed preferably from a dielectric plastic material or insulated metallic material where it is desired, for example, to provide an insulated enclosure about an electrical joint or connection. Alternatively, the outer members 22 and 24 may be formed from a suitable non-insulated metallic material, however, where an electrically insulated enclosure is either unnecessary or undesirable. The liner means 42, 44 is formed preferably from a highly resilient material such as, for example, closed-cell sponge rubber or the like to permit its close conformation about the outer surface of the enclosed connection or joint. As illustrated in greater detail in the cut away section shown in FIG. 1, the resiliency of the liner means 42 is advantageously employed to provide a tight fit about the nonuniform contours exemplified by the outer surface of a splice connector 66 joining the bared ends 68, 70 of conductors 72, 74 and the outer surface of the insulative cover of both conductors 72, 74, as shown, for example at 76. The close conformation between the liners 42, 44 and the adjacent surface of the conductors disposed within the enclosure 20 serves to provide a tight seal thereabout preventing the intrusion of dirt, moisture and other contaminants which may be detrimental to the joint enclosed therewithin. As may be more clearly seen in FIGS. 2 and 3, each of the liner means 42, 44 is provided with a pair of longitudinally extending terminating edges 78, 80, respectively, which tightly abut the opposing pair of edges when the two outer members 22 and 24 of the enclosure 20 are interlocked together, to further seal the interior of the enclosure 20. Thus, the enclosure 20 serves to provide both an insulative covering and a seal about the joint 66 and the area adjacent thereto upon the interlocking of the respective members 22, 24 thereabout. Upon closure of the members 22, 24, the liners 42, 44 are further deformed slightly outwardly to provide a closure adjacent the seam formed by the respective interlocking male and female portions 50, 56 and 52, 54 of the latch means, as may be more clearly seen in the cross sectional view shown in FIG. 3. The highly resilient nature of the liner means 42, 44 may thus be advantageously utilized to fill and seal any irregularities or discontinuties in either the outer surface of the joint 66 or the inner surface of the outer members 22, 24. The selective interlocking arrangement provided by the series of complementarily formed teeth on the mating male and female portions of the latch means permits the outer members 22, 24 to be interlocked or engaged in any one of a number of selective positions, and such arrangement in combination with the highly resilient liner means 42, 44 further increases the versatility of the enclosure 20 by permitting its employment over a greater range of joint sizes than would be possible with either a single position latch means or relatively nonconforming liner means. It will of course be readily appreciated that where necessary or desirable, the liners 42, 44 may be formed from materials other than closed-cell sponge rubber, including, for example, Nylon, Delrin, PVC, or any one of a number of varities of foam plastic or felt-like material, according to the specific application and conditions under which the enclosure may be employed. The inner surfaces 46, 48 of the liners 42, 44, although shown in FIG. 2 as generally arcuate may be contoured to provide other suitable arrangements as shown, for example, at 82 in FIG. 5 and at 84 in FIG. 9. It may, of course, be readily appreciated that the liner means 42, 44 may be employed without the recesses heretofore described, where, for example, a relatively small joint or splice is to be enclosed, in which case, the natural resiliency of the material will be sufficient to permit the outer members 22, 24 to be disposed about said joint or connection and interlocked without undue force or pressure. As further illustrated in FIG. 9, the generally arcuate shape of members 22, 24 may be readily modified as at 86 to provide a generally octagonally shaped enclosure or, where necessary or desirable, a hexagonal, rectangular, or other non-circular shape without departing from the spirit of the invention and within the concepts herein disclosed. The male and female latch portions 50, 52 and 54, 56 although illustrated in FIG. 2 as having teeth disposed on only one surface thereof, may be modified as shown, for example, in FIG. 4, wherein a latch means male portion 88 is provided with teeth 90 on both the inner and outer surfaces thereof and the latch means female portion 92 is provided with a series of complementarily formed teeth 94 on both of its inner surfaces for mating engagement with the male portion teeth 90 to provide additional locking engagement, where necessary or desirable. Where it is desired to increase the stiffness of the outer members 22, 24, one or more raised ribs such as 96 (FIG. 7) extending generally longitudinally adjacent the outer surfaces 26, 28 of members 22, 24 may be provided to increase the cross sectional area thereat. This arrangement may be highly desirable where the main body portions of the members 22, 24 are either extruded, molded, or formed to define a relatively thin cross-section yet are required to possess at least a predetermined rigidity in use. The inner surfaces 30, 32 of members 22, 24 (FIG. 2) may have provided therein one or more generally longitudinally extending recesses such as 98 shown in FIG. 8 for the engagement therewithin of selective portions of the liners 42 or 44. This arrangement may be found useful where it is desired to avoid the use of cementing or bonding material to maintain the liner in a desired position adjacent the inner surface of the outer member during handling and assembly. The liner may either be pressed into place to effect the interlocking arrangement shown in FIG. 8, or provided with raised portions adjacent the outer surface thereof, each proportioned to fit tightly within an associated one of the recesses 98. It will of course be readily appreciated that the recesses 98 shown in FIG. 8 and the raised portions or ribs 96 shown in FIG. 7 may be readily employed with any one of the various embodiments illustrated or described heretofore. Where it is desired to disassemble the enclosure 20 from the joint or connection enclosed therewithin, it is merely necessary to spread the opposing portions of the female portion 54, 56 of the latch means sufficiently to permit the respective mating male portions 52, 50 to be withdrawn therefrom and the members 22, 24 disassembled from about the enclosed joint or connection. Since the structural integrity of the individual elements of the assembly is unaffected by such disassembly, the enclosure is thus readily and economically available for repeated re-use, as necessary or desirable.

Turning now to FIG. 10 there is shown a further embodiment of an enclosure 100 constructed in accordance with the concepts of the invention. As illustrated, enclosure 100 comprises three discrete outer members 102, 104 and 106 each having a male latch means portion 108, 110, and 112, respectively, essentially similar to the male latch means portions 50 and 52 of enclosure 20, and a female latch means portion 114, 116 and 118, respectively, each similar to the female latch means portions 54, and 56 of enclosure 20, and a liner 103, 105, 107, respectively, similar to liners 42 and 44 of enclosure 20. The enclosure 100 may be formed simply by disposing the female latch means portion 114 of member 102 adjacent the male latch means portion 110 of member 104 and selectively interengaging said respective portions 114 and 110, and thereafter repeating such procedure with the remaining latch means male and female portions 112 and 116 and 108 and 118 in any desired order. It will of course be readily appreciated that although the enclosures 20 and 100 are illustrated as comprised of generally equally proportioned segments, such arrangement is not essential and a structure formed from unequally proportioned segments may be employed where necessary or desirable to effect a similar arrangement. Although only three discrete members are shown in FIG. 10, further members such as 102, 104 and 106 may be added and intercoupled thereto in a manner similar to that described heretofore. It is thus seen that a structure similar to that illustrated in FIG. 10 may comprise four, or more interengaged members suitably proportioned and arranged to provide the desired enclosure.

The assembly and disassembly of the individual members of the enclosure 20 or 100 may be more readily effected by the employment of an arrangement similar to that shown in FIG. 6, wherein one or more notches or recesses 120 may be provided to divide the laterally extending male latch portions into two or more discrete sections whereby each section may be individually engaged with or disengaged from its respective mating female latch portion which may or may not be similarly divided.

Figure 11:
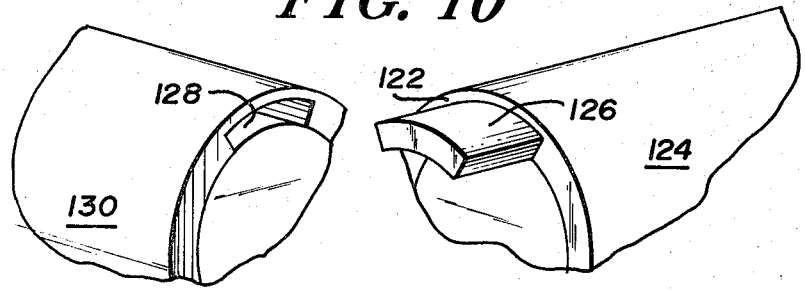
FIGS. 11 and 12 are fragmentary perspective views of further embodiments of two members of an enclosure constructed in accordance with the concepts of the invention illustrating an interlocking arrangement therefor.
Figure 12:
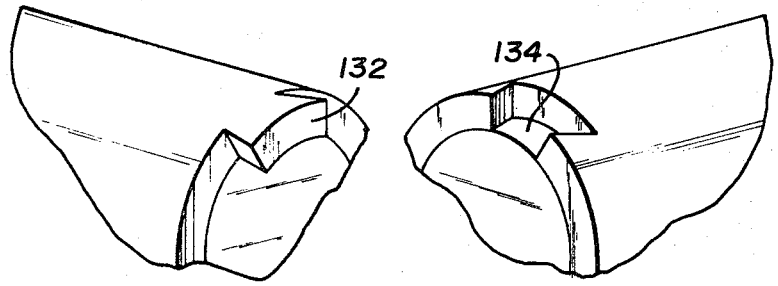

The individual members of either the enclosure 20, 100, or any of the above described embodiments thereof may be longitudinally joined one to another by providing means such as illustrated for example in FIGS. 11 and 12. For example, in FIG. 11 there is shown, extending outwardly from an end 122 of an outer member 124, a tab 126 suitably proportioned to fit tightly within a recess 128 in a further member 130 whereby members 124 and 130 may be joined in end-to-end relationship. By providing each of the members 124 and 130 with a tab such as 126 adjacent one end thereof and a recess such as 128 adjacent its other end, a hermaphroditic arrangement may thus be created whereby any member such as 124 or 130 may be longitudinally coupled to an adjacently disposed member to provide an enclosure having a length greater than that of the individual members. An alternative interlocking arrangement is illustrated in FIG. 12 wherein a tab 132 and a mating recess 134 are arranged to provide a dove tail type joint providing increased resistance to disassembly in the longitudinal direction yet readily disengageable by merely radially offsetting the members with respect to one other. It will of course be readily apparent to those skilled in the art that other suitable locking arrangements including, for example, interlocking bifurcated tabs (not shown) may be employed without departing from the spirit of the invention and within the concepts herein disclosed.

It will further be appreciated that although the various embodiments described above have been indicated as highly desirable for use in conjunction with splice connections or the like, they may be readily employed to provide a protective or insulative enclosure about a selective portion of any generally tubular article, including, for example, pipes, tubes, and rods.

The embodiments of the invention in which an exclusive property or privilege is claimed are defined as follows:

1. Means for enclosing a spliced connection or the like comprising: at least first and second generally elongate members arranged to be interlocked one to another to form a generally tubular enclosure, said members each having an outer surface, an inner surface, a first edge, and a second edge; latch means comprising interengageable mating male and female portions each comprising a plurality of spaced teeth disposed adjacent at least one surface thereof, at least one latch means male portion extending generally laterally adjacent at least a portion of said first edge of each of said first and second members, and at least one latch means female portion extending generally laterally adjacent at least a portion of said second edge of each of said first and second members, said latch means male and female portions being arranged for selectively positionable locking interengagement upon the disposition of a selective one of said first and said second member first edges adjacent a selective one of said first and said second member second edges; and resilient liner means at least partially disposed adjacent at least a portion of said inner surface of each of said first and said second members, each of said liner means having an inner surface selectively contoured to define at least a portion of a variable article receiving chamber, each of said latch means female portions being defined by an inner leg and an outer leg, and each of said latch means male portions being selectively spaced from said liner means to provide a given gap therebetween, said latch means female portion inner legs each being proportioned to fit snugly within said gap between an associated one of said latch means male portions and said liner means, said latch means female portion inner and outer legs being proportioned to encompass said latch means male portion therebetween, to form a multiplanar composite seam including the confronting surfaces of said latch means male and female portions; whereby at least said first and said second members may be peripherally disposed about a spliced connection or the like and said adjacently disposed latch means male and female portions selectively interlocked one to another to form a complete enclosure.

2. Means for enclosing a spliced connection or the like as defined in claim 1 wherein said first and second members are formed from electrically insulating material.

3. Means for enclosing a spliced connection or the like as defined in Claim 1 wherein said liner means is formed from highly compressible material.

4. Means for enclosing a spliced connection or the like as defined in claim 1 wherein said series of teeth are disposed adjacent at least two surfaces of each of said latch means male and female portions.

5. Means for enclosing a spliced connection or the like as defined in claim 1 wherein said first and second members are generally arcuate.

6. Means for enclosing a spliced connection or the like as defined in claim 1 wherein at least one of said first and said second members further comprises at least one generally elongate raised portion extending generally longitudinally adjacent said outer surface thereof to provide increased stiffness thereto.

7. Means for enclosing a spliced connection or the like as defined in claim 1 wherein at least one of said first and said second members further has at least one generally elongate recess extending generally longitudinally adjacent said inner surface thereof, said recess being proportioned to accommodate a selective portion of said liner means therein.

8. Means for enclosing a spliced connection or the like as defined in claim 7 wherein at least one of said first and said second members further comprises at least one generally elongate raised portion extending generally longitudinally adjacent said outer surface thereof to provide increased stiffness thereto.

9. Means for enclosing a spliced connection or the like as defined in claim 1 wherein said first and said second members are generally symmetrical.

10. Means for enclosing a spliced connection or the like as defined in claim 9 wherein at least one of said first and second members further has at least one generally elongate recess extending generally longitudinally adjacent said inner surface thereof, said recess being proportioned to accommodate a selective portion of said liner means therein.

11. Means for enclosing a spliced connection or the like as defined in claim 10 wherein at least one of said first and said second members further comprises at least one generally elongate raised portion extending generally longitudinally adjacent said outer surface thereto to provide increased stiffness thereof.

12. Means for enclosing a spliced connection or the like as defined in claim 9 wherein said first and said second members are generally arcuate.

13. Means for enclosing a spliced connection or the like as defined in claim 9 wherein said series of teeth are disposed adjacent at least two surfaces of each of said latch means male and female portions.

14. Means for enclosing a spliced connection or the like as defined in claim 13 wherein said first and said second members are generally arcuate.

* * * * *